(12) United States Patent
Bahr

(10) Patent No.: US 11,004,430 B2
(45) Date of Patent: May 11, 2021

(54) PITCH ADJUSTMENT FOR A VALVE BRASS MUSICAL INSTRUMENT

(71) Applicant: Justin Andrew Bahr, Great Falls, VA (US)

(72) Inventor: Justin Andrew Bahr, Great Falls, VA (US)

( * ) Notice: Subject to any disclaimer, the term of this patent is extended or adjusted under 35 U.S.C. 154(b) by 0 days.

(21) Appl. No.: 16/931,910

(22) Filed: Jul. 17, 2020

(65) Prior Publication Data

US 2020/0349910 A1    Nov. 5, 2020

(51) Int. Cl.
| | |
|---|---|
| G10D 9/01 | (2020.01) |
| F16K 31/06 | (2006.01) |
| G10D 9/04 | (2020.01) |
| G10D 7/10 | (2006.01) |
| F16K 37/00 | (2006.01) |

(52) U.S. Cl.
CPC ........... *G10D 9/01* (2020.02); *F16K 31/0675* (2013.01); *F16K 37/00* (2013.01); *G10D 7/10* (2013.01); *G10D 9/04* (2013.01)

(58) Field of Classification Search
CPC ... G10D 9/01; G10D 9/04; G10D 7/10; F16K 31/0675; F16K 37/00
See application file for complete search history.

(56) References Cited

U.S. PATENT DOCUMENTS

| | | | |
|---|---|---|---|
| 1,662,076 A | 3/1927 | Newman | |
| 2,181,346 A | 11/1939 | Selmer | |
| 2,798,401 A | 7/1957 | Miller | |
| 4,276,804 A | 7/1981 | Holland | |
| 4,512,233 A | 4/1985 | Holland | |
| 7,335,831 B2 | 2/2008 | Laukat et al. | |
| 7,667,117 B2 | 2/2010 | Wasser et al. | |
| 7,786,372 B2 | 8/2010 | Saweda et al. | |
| 7,999,164 B2 | 8/2011 | Satomi | |
| 9,595,246 B2 | 3/2017 | Hagstrom | |
| 9,761,206 B2 | 9/2017 | Ban | |
| 9,765,901 B2 | 9/2017 | Harper et al. | |
| 10,249,270 B2 | 4/2019 | Catalano et al. | |
| 2007/0234887 A1* | 10/2007 | Sawada | G10D 9/04 84/723 |

OTHER PUBLICATIONS

Thibodeau et al.; "Trumpet Augmentation and Technological Symbiosis"; Computer Music Journal, MIT Press; vol. 37, Issue 3; Sep. 2013; pp. 12-25.

* cited by examiner

*Primary Examiner* — Kimberly R Lockett

(57) ABSTRACT

Disclosed is a pitch adjuster for a musical instrument having valves for selectively directing air flow through additional tubes and tuning slides on at least some of the additional tubes. The pitch adjuster automatically adjusts the tuning slides depending upon which valves are directing the air flow to pass through their additional tubes. There are a pair of adjustable linear solenoids connected between the additional tubes and their tuning slides, each of which adjusts the tuning slide when the solenoid is energized. There are sensors to detect whether each valve is directing the air flow through its additional tube. There is also a controller connected to sensors and solenoid for energizing the selected solenoids when the controller receives input from at least two sensors that the valves are directing the air flow to pass through their additional tubes.

20 Claims, 9 Drawing Sheets

PITCH ADJUSTMENT FOR A VALVE BRASS MUSICAL INSTRUMENT

FIELD OF THE INVENTION

The invention pertains to brass instruments in which pitch is adjusted by the use of a set of valves.

BACKGROUND OF THE INVENTION

Brass musical instruments, and trumpets in particular, use valves to change their pitch and commonly have tuning slides on their additional tubes to allow for tuning of the additional tube of each valve. Newman (U.S. Pat. No. 1,662,076), Holland (U.S. Pat. No. 4,276,804), and Holland (U.S. Pat. No. 4,512,233) each disclose a trumpet in which there is a finger trigger mechanism for adjusting the third valve additional tube tuning slide. Sawada et al. (U.S. Pat. No. 7,786,372) disclose a trumpet in which a solenoid actuator is used to operate the valves in response to sensors detecting finger pressure on the valve keys. Catalano et al. (U.S. Pat. No. 10,249,270) disclose a system for compromise tuning a valve operated instrument in which the tuning slide is moved by the musician or an actuator. Thibodeau et al. (Trumpet Augmentations and Technological Symbiosis) discuss the augmentation of a trumpet in which sensors are used to detect the position of the valves.

SUMMARY OF THE INVENTION

The pitch of a brass musical instrument is adjusted in a two-fold manner. First, the harmonic partial is changed by tightening and loosening the tension of the player's lips, thus creating a higher or lower sounding buzz. Tight lips and a fast stream of air pushed through them cause a high frequency of vibrations, resulting in the instrument producing a high note. Conversely, looser lips cause a low frequency of vibrations, resulting in the instrument producing a low note. The harmonic partials are limited to the fundamental, halves (concert B b), thirds (concert F), fourths (concert B♭), fifths (concert D), sixths (concert F), sevenths (concert A, very flat), and eights (concert B♭), etc.

The length of tubing of the brass instrument is adjusted to play notes otherwise between the harmonic series. The rule is the longer the tubing the lower the pitch. This is accomplished on a slide trombone by extending the slide. The slide allows for continuous change in tubing length, but changing between slide positions can take more time than desirable, especially when changing between distant slide positions.

Many brass instruments use piston or rotary valves to more quickly change the pitch of the instrument. Brass instruments most commonly have three valves to accomplish this, the valves selectively directing the air flow to bypass or pass through additional tubes of different lengths. The first valve selectively directs the air flow to pass through an additional tube (first additional tube) that lowers the pitch by about two semitones, or to Eb in the F (thirds) harmonic partial. The second valve selectively directs the air flow to pass through an additional tube (second additional tube) that lowers the pitch by about one semitone, or to E in the F (thirds) harmonic partial. The third valve selectively directs the air flow to pass through an additional tube (third valve additional tube) that lowers the note by about three semitones, or to D in the F (thirds) harmonic partial. Each valve is operable by a valve key, which when depressed moves the valve into a position that directs the air flow into its additional tube and when released moves the valve into a position that directs the air flow to bypass its additional tube.

The three-valve brass instruments provide additional pitches within a harmonic partial by using the three valves in combination. The first and second valves together will direct the air flow to pass through the first and second additional tubes and lower the pitch by about three semitones, or again to D in the F (thirds) harmonic partial. The first and second valves together, rather than the third valve, are commonly used to lower the harmonic partial by three semitones. The second and third valves together will direct the air flow to pass through the second and third additional tubes and lower the pitch by about four semitones, or to Db in the F (thirds) harmonic partial. The first and third valves together will direct the air flow to pass through the first and third additional tubes and lower the pitch by about five semitones, or to C in the F (thirds) harmonic partial. All three valves together will direct the air flow to pass through the first, second, and third additional tubes and lower the pitch by about six semitones, or to B in the F (thirds) harmonic partial The problem is that brass instruments using piston or rotary valves may adjust the length of tubing only by discrete amounts, but the additional tubing necessary to lower the pitch four, five, and six semitones does not exactly equal the tubing added by using the available additional tubing combinations. The additional tubing necessary to lower the pitch by five semitones is slightly longer than the additional tubing necessary to lower the pitch by two semitones (first additional tubing) and three semitones (third additional tubing), and the additional tubing necessary to lower the pitch by six semitones is slightly longer than the additional tubing necessary to lower the pitch by two semitones (first additional tubing), one semitone (second additional tubing), and three semitones (third additional tubing). In addition, the additional tubing necessary to lower the pitch by four semitones is slightly longer than the additional tubing necessary to lower the pitch by two semitones (first additional tubing) and one semitone (second additional tubing). Thus, using first and second valves to lower the pitch by three semitones and using second and third valves to lower the pitch by five semitones results in these semitones being sharp, by 10 to 15 cents, and using the first, second, and third valves to lower the pitch by six semitones results in this semitone being quite sharp, by 20 to 25 cents.

There are ways to compensate for this. One way is to provide a fourth valve that itself directs the air flow to bypass or pass through an additional tube that lowers the pitch by five semitones. The fourth valve allows for accurate initial adjustment of the tubing to reduce the pitch by one, two, three, and five semitones, without the need for a player to adjust the tubing while playing the instrument. One can also provide additional valves, for example, a fifth and sixth valve. The valve and tube for a fourth (or additional) valve, however, adds weight and bulk to the instrument and an instrument with four or more valves would be playable only by an advanced musician.

Another way is to provide for adjustment of the first additional tube and third additional tube. Brass instruments with valves often include a tuning slide adjustment on the additional tubes to permit the length of the additional tube for each valve to be individually adjusted. This tuning slide adjustment permits a player to adjust the length of the first and/or third additional tube to reach the correct pitch when valves are used in combination.

These ways are satisfactory for proficient brass players, but work poorly for beginner or novice players. Four (or more) valve brass instruments are too costly and complex to be practical for a beginner or novice players. Brass instruments with a tuning slide adjustment for the first and third valve are in common use, but these tuning slide adjustments are not often used properly by beginner or novice players. The improper use of these tuning slide adjustments will result in the beginner or novice player becoming accustomed to hearing the lowered fifth and sixth semitones sharp. That will have the deleterious effect of ultimately "training" the beginner or novice player's ear to perceive a sharp lowered fifth or sixth semitone as the correct pitch for the lowered fifth or semitone.

The improvement of the present invention provides for an automatic adjustment of the first and third additional tube tuning slides while the player is playing the musical instrument. The improved pitch adjuster has an actuator connected to each of the first and third additional tubes and their tuning slides, each actuator having a neutral position and an engaged position. The neutral position of each actuator places the first and third additional tube tuning slides in a preset neutral, not extended position. The engaged position of each actuator places the first and third additional tube tuning slides in an engaged position, which extends or lengthens the first and third additional tube tuning slides a predetermined distance relative to the neutral position of the respective first and third additional tube tuning slides. Moving the first and/or third actuator from the neutral position to the engaged position increases the length of the respective first and/or third additional tubes and lowers the pitch relative to the neutral position of the respective first and/or third additional tube tuning slides. Since the actuators adjust the first and third additional tube tuning slides while the player is playing the musical instrument, it is preferable that the actuators be capable of moving the first and third additional tube tuning slides rapidly between the neutral position and engaged position. The actuators may be a pair of solenoid assemblies that when not energized move or bias the first and third additional tube tuning slides (respectively) to the neutral position and when energized move or bias the first and third additional tube tuning slides to the engaged position. The actuators are described as removably connected to the first and third additional tubes and their tuning slides, but the actuators may be fixedly connected to the instrument.

A sensor is included for detecting the condition of the valves, namely for detecting whether each valve is in the position that directs air flow to bypass its additional tube (the first position) or is in the position that directs air flow into its additional tube (the second position). The sensor may be located within the valve itself or external to the valve. The sensors are described as proximity sensors, but may be any mechanism capable of detecting the status of its valve, such as piezoelectric or other sensor or detection mechanism.

A power supply for the actuators is also included. The power supply may be any power source, such batteries, capable of powering the actuators. There may be a common power supply for both actuators or a separate power supply for each actuator. The power supply may be connected to the brass instrument itself or may be worn by the player and connected (by wires) to the actuators.

A controller is included to receive input from the sensors concerning the condition of the valves and selectively energize the actuators depending upon the condition of the valves. The power supply is connected, for example by wires, to each actuator through the controller. Depending upon the input from the sensors concerning the condition of the valves, the controller: (1) completes the connection between the power supply and the actuator connected to the first additional tube and its tuning slide, (2) completes the connection between the power supply and the actuator connected to the third additional tube and its tuning slide, (3) completes the connection between the power supply and both the actuator connected to the first additional tube and its tuning slide and the actuator connected to the third additional tube and its tuning slide, or (4) leaves an open circuit between the power supply and both the actuator connected to the first additional tube and its tuning slide and the actuator connected to the third additional tube and its tuning slide.

The following is an example of how the actuators may be set to automatically adjust the pitch during operation. The neutral position for the first additional tube tuning slide would be set or adjusted to be the correct first additional tube length to lower the pitch by two semitones, and the second additional tube tuning slide would be set to be the correct second additional tube length to lower the pitch by one semitone. The neutral position for the third additional tube tuning slide would be set or adjusted to be the correct third additional tube length in addition to the second additional tube length to lower the pitch by four semitones. Since the first and second valves together are customarily used (rather than the third valve) to lower the pitch by three semitones, the third additional tube may be adjusted to be closer to the length necessary when used in combination with the first and/or second valves to lower the pitch by four, five or six semitones. The engaged position for the first additional tube tuning slide would be set or adjusted to be the correct first additional tube length in addition to the second additional tube length to lower the pitch by three semitones. The engaged position for the third additional tube tuning slide would be set or adjusted to be the correct third additional tube length in addition to the first additional tube length (with the first additional tube tuning slide in the neutral position) to lower the pitch by five semitones. The engaged position for the first additional tube tuning slide and the engaged position for the third additional tube tuning slide in conjunction with the second additional tube length will lower the pitch by about six semitones, as the engaged position for the first additional tube tuning slide and the engaged position for the third additional tube tuning slide will adjust each of the lowered third and fifth semitones by 10 to 15 cents and the adjustment necessary for the lowered sixth semitone is between 20 and 25 cents.

In this example, the controller completes the connection between: (1) the power supply and the actuator connected to the first additional tube and its tuning slide if the sensors indicate that the first valve and second valve are in the position that directs air flow into their additional tubes, (2) the power supply and the actuator connected to the third additional tube and its tuning slide if the sensors indicate that the first valve and third valve are in the position that directs into their additional tubes, and (3) the power supply and both the actuator connected to the first additional tube and its tuning slide and the actuator connected to the third additional tube and its tuning slide if the sensors indicate that the first valve, second valve, and third valve are in the position that directs air flow into their additional tubes. In this example, however, the controller leaves an open circuit between the power supply and both the actuator connected to the first additional tube and its tuning slide and the actuator connected to the third additional tube and its tuning slide if the sensors indicate that: (1) only the first valve is in the position that directs air flow into its additional tube, (2) only the second valve is in the position that directs air flow into its additional tube, (3) only the third valve is in the position that directs air flow into its additional tube, (4) only the second valve and the third valve are in the position that directs air flow into their additional tubes, or (5) none of the first valve, second valve, or third valve are in the position that directs air flow into their additional tubes.

The automatic adjustment of the first and third additional tube tuning slides while the player is playing the instrument will avoid training the beginner or novice player's ear to perceive a sharp lowered fifth or sixth semitone as the correct pitch for the lowered fifth or sixth semitone. The feel of the automatic adjustment of the first and third additional tube tuning slides while playing the instrument will also make the beginner or novice player accustomed to the feel of the first and third additional tube tuning slides moving during playing.

While this is discussed with respect to two valves in a three valve instrument, it is apparent that it is possible to provide an actuator for each valve (i.e., three actuators for a three valve instrument) or to provide such actuators on a musical instrument having any number of valves. The preferred embodiment is disclosed in detail with respect to a B♭ trumpet, but the invention is applicable to any brass instrument using valves to adjust the pitch such as trumpets in other keys, cornets, flugelhorns, valve trombones, baritones, alto horns, tubas, and sousaphones. While the musical instrument is described as a "brass" instrument, the invention is applicable to any musical instrument having valves to selectively direct air flow to additional tubes, regardless of the material from which the instrument is made.

DETAILED DESCRIPTION OF THE INVENTION

Figure 1:
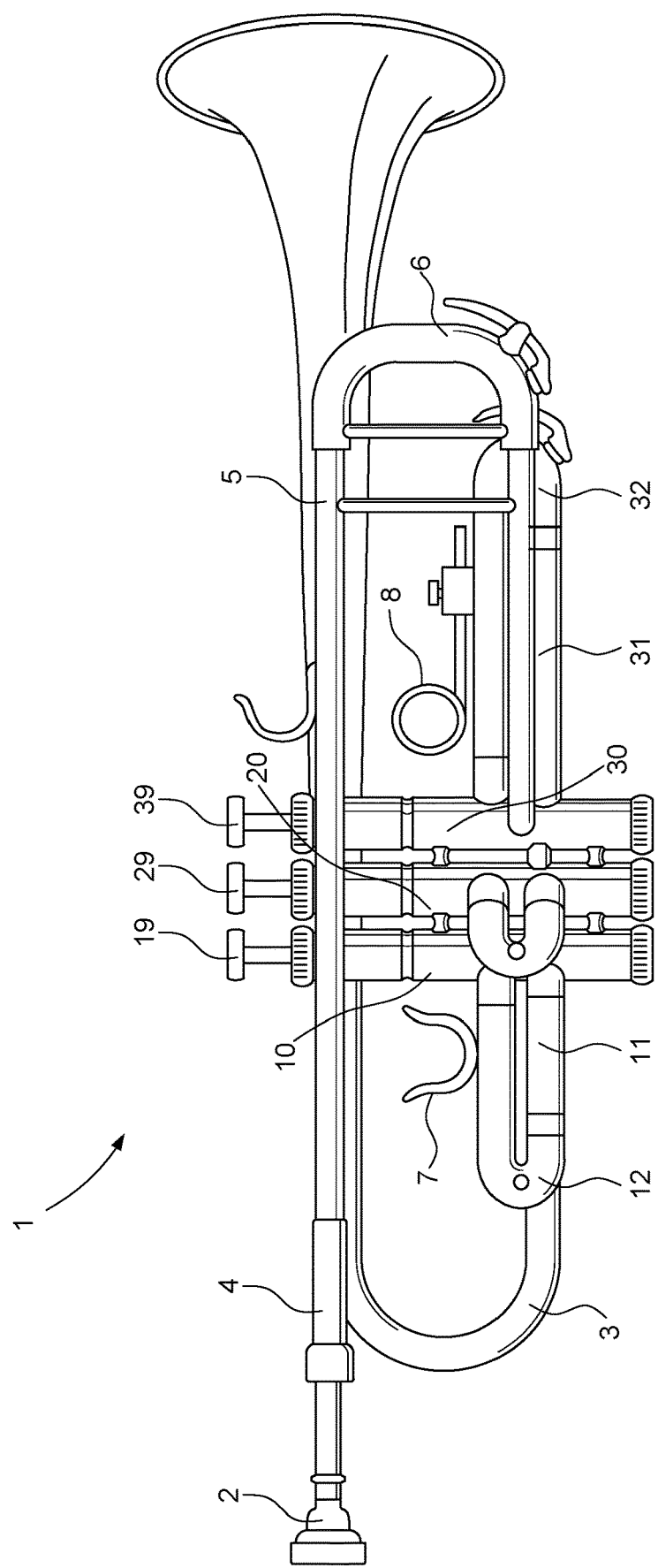
FIG. 1 shows a side view of a conventional B♭ trumpet.

FIG. 1 shows a side view of a conventional B♭ trumpet 1 having a mouthpiece 2 and a main tube 3 leading to a bell 9. The main tube 3 has a mouthpiece receiver 4, a lead pipe 5, and a main tuning slide 6 for tuning the trumpet. The trumpet also includes three piston valves, a first valve 10 for selectively diverting air flow to a first additional tube 11, a second valve 20 for selectively diverting air flow to a second additional tube 21, and a third valve 30 for selectively diverting air flow to a third additional tube 31. The valves 10, 20, 30 and additional tubes 11, 21, 31 allow for the length of the tubing through which the air flow passes between the mouthpiece 2 and bell 9 to be changed, which changes the pitch of the trumpet 1 within a harmonic partial.

The trumpet also includes three valve keys for engagement by the player's finger to selectively operate each valve, a first valve key 19 that when depressed moves the first valve 10 into a position in which it diverts air flow to the first additional tube 11, a second valve key 29 that when depressed moves the second valve 20 into a position in which it diverts air flow to the second additional tube 21, and a third valve key 39 that when depressed moves the third valve 30 into a position in which it diverts air flow to the third additional tube 31. When no valve key is depressed, air flow is straight from the mouthpiece 2 through the main tube 3 to the bell 9, bypassing the first, second, and third additional tubes 11, 21, 31. Depressing the first 19, second 29, or third 39 valve key moves the respective first 10, second 20, or third 30 valve from a first position in which air flow bypasses the first, second, and third additional tubes 11, 21, 31 into a second position that diverts the air flow to pass through the respective first additional tube 11, second additional tube 21, or third additional tube 31. This changes the length of the tubing through which the air flow passes from the mouthpiece 2 to the bell 9. The instrument also includes a first additional tube tuning slide 12, a second additional tube tuning slide 22, and a third additional tube tuning slide 32, each additional tube 11, 21, 31 thus having a portion that is fixed relative to the main tube and a tuning slide 12, 22, 32. The first additional tube tuning slide 12 and third additional tube tuning slide 32 each include a finger saddle 7 or finger ring 8.

Figure 2:
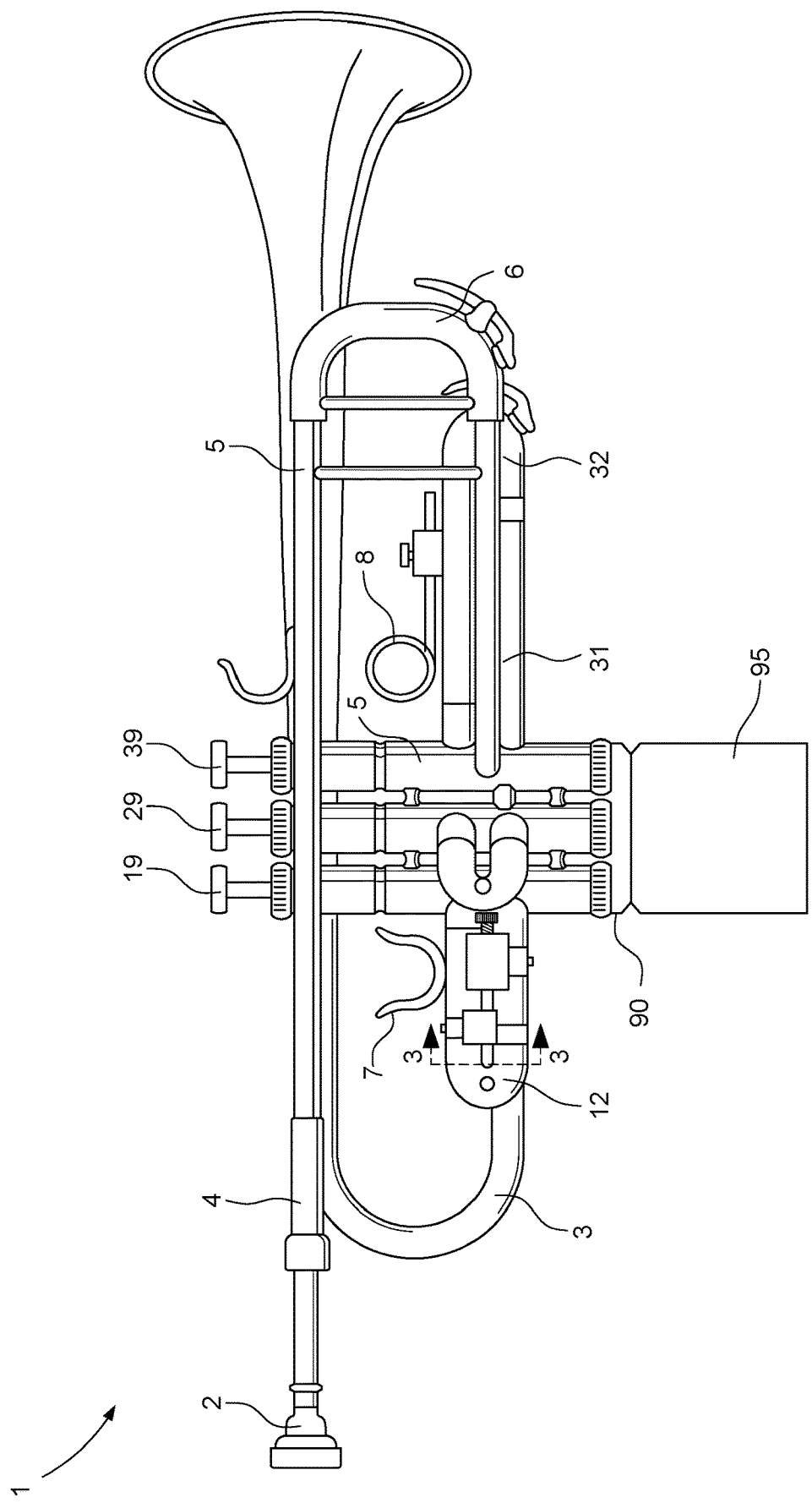
FIG. 2 shows a side view of the valves and tubes of a B♭ trumpet with an actuator, controller, and power source of the invention.

FIG. 2 shows a side view of a B♭ trumpet 1 with one of the pair of actuators 50, namely the actuator 50 for the first additional tube 11, a controller 90, and power source 95 for selectively energizing each of the actuators 50. The actuator 50 for the first additional tube 11 is connected between the fixed portion of the first additional tube 11 and first additional tube tuning slide 12. The other of the pair of actuators is connected between the fixed portion of the third additional tube 31 and third additional tube tuning slide 32.

Figure 3:
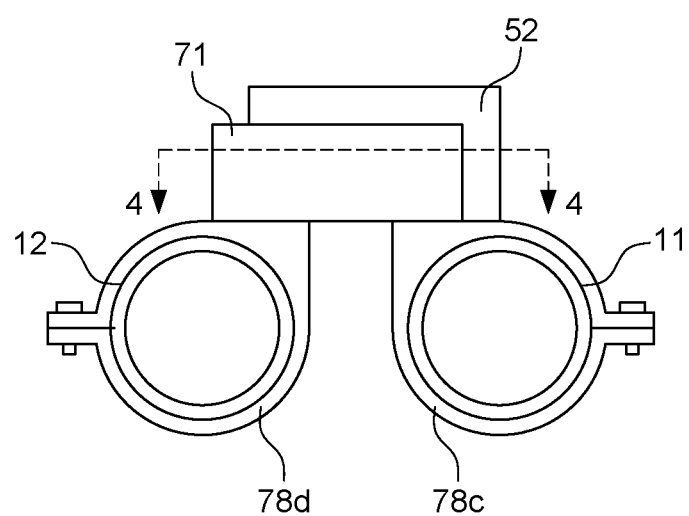
FIG. 3 shows a section view of the first additional tube and front view of the first additional tube actuator.

Each actuator 50 is preferably a linear solenoid assembly as a solenoid assembly will provide for rapid movement between two predetermined positions (the neutral position and engaged position). As discussed previously, since the actuators adjust the first and third additional tube tuning slides while the player is playing the musical instrument, it is preferable that the actuators be capable of moving the first and third additional tube tuning slides rapidly between the neutral position and engaged position. FIG. 3 shows a section view of the first additional tube 11 and first additional tube tuning slide 12 and front view of the first additional tube actuator, namely linear solenoid assembly 71. Each linear solenoid assembly has a frame 52 and a block assembly 77 (discussed in detail with respect to FIG. 4). The frame 52 and block assembly 77 are preferably connected in a removable manner by, for example, a conventional clamp 78c, 78d to the fixed portion of the first additional tube 11 and first additional tube tuning slide 12, respectively (discussed in detail with respect to FIGS. 5 and 6).

Figure 4:
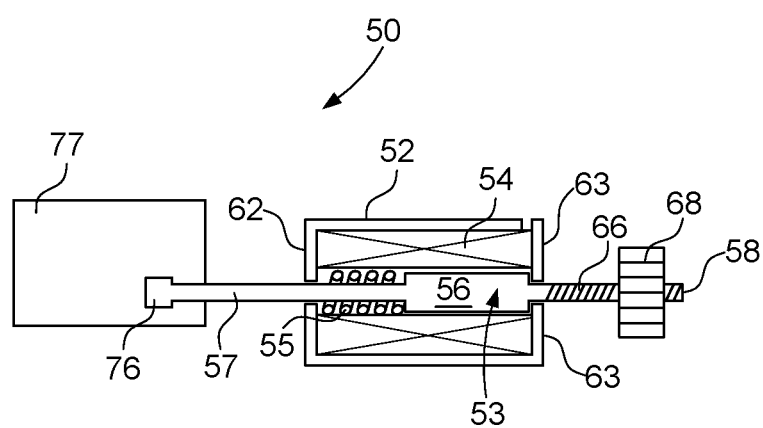
FIG. 4 shows a partial section side view of the actuator or solenoid assembly.

FIG. 4 shows a partial section side view of one of the pair of actuators 50. As discussed previously, each actuator is preferably a linear solenoid assembly. Each solenoid assembly includes a frame 52 having a first side 62 and a second side 63 on opposed ends. Each solenoid assembly also includes a linearly extending plunger 53 having a central section 56 of enlarged diameter and first and second end sections 57, 58 of a diameter or diameters smaller than the diameter of the central section 56, the first end section 57 extending through an opening in the first side of the frame 62, and the second end section 58 extending through an opening in the second side of the frame 63. Each solenoid assembly also includes a coil winding 54 within the frame about the plunger 53 and a coil return spring 55. The plunger 53 moves in a linear manner in the direction of the first end section 57 of the plunger 53 when the solenoid assembly is energized. The plunger 53 would have a stroke or throw sufficient to make the necessary adjustment to the slides. The coil return spring 55 is located within the frame 52 between the first side of the frame 62 and central section 56 of the plunger 53. The coil return spring 55 is of a diameter larger than the diameter of the first end section 57 of the plunger 53, and encircles the first end section 57 of the plunger 53. The coil return spring 55 biases the plunger 53 toward its second end section 58 and moves the plunger 53 in that direction when the solenoid assembly is not energized.

The first end section 57 of the plunger 53 terminates in an enlarged end portion 76. The solenoid assembly also includes a block assembly 77 with an opening therein for receiving and retaining the enlarged end 76 of the first end section 57 of the plunger 53. The connection between the enlarged portion 76 of the first end section 57 of the plunger 53 and the block assembly 77 maintains the relative linear position of the block assembly and the frame 52 of the solenoid assembly, but permits some amount of play in the direction perpendicular to the direction of movement of the plunger 53. The second end section 58 of the plunger 53 is threaded 66 and extends from the second side of the frame 63. There is a knurled nut 68 on the threaded portion 66 of the second end section 58 of the plunger 53. When the solenoid assembly is energized, the movement of the plunger 53 toward its first end section 57 will stop when the knurled nut 68 reaches the second side of the frame 63. Thus, the stoke or throw of the plunger 53 can be adjusted by moving the knurled nut 68 the threaded portion 66 of the second end section 58 of the plunger 53 by rotating the knurled nut 68 clockwise or counterclockwise on the threaded portion 66 of the second end section 58 of the plunger 53.

There is a first additional tube solenoid assembly 71 and a third additional tube solenoid assembly 72. The first additional tube solenoid assembly 71 is removably connected at one end to the fixed portion of the first additional tube 11 and removably connected at the other end to the first additional tube tuning slide 12. The third additional tube solenoid assembly 72 is removably connected at one end to the fixed portion of the third additional tube 31 and removably connected at the other end to the third additional tube tuning slide 32.

Figure 5:
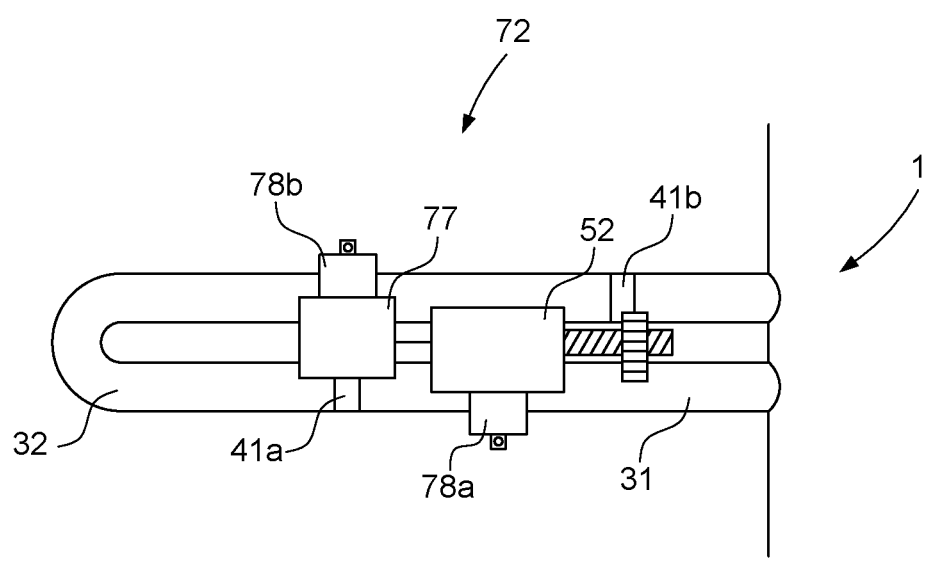
FIG. 5 shows a side view of the solenoid assembly connected to the third additional tube in the neutral position.

FIG. 5 shows the third additional tube solenoid assembly 72 removably connected to the third additional tube 31 and in the neutral position. The frame 52 of the third additional tube solenoid assembly 72 is removably connected by, for example, a conventional clamp 78a to the fixed portion of the third additional tube 31 or to any fixed part of the trumpet 1. The block assembly 77 of the third additional tube solenoid assembly 72 is removably connected by, for example, a conventional clamp 78b to the third additional tube tuning slide 32. For the neutral position of the third additional tube solenoid assembly 72, the additional tube tuning slide 32 is set or adjusted to a first predetermined position, which may be, for example, to provide the correct third additional tube length in addition to the second additional tube length to lower the pitch by four semitones. The third additional tube solenoid assembly 72 may be set or adjusted to its neutral position by first connecting the frame 52 of the third additional tube solenoid assembly 72 to the fixed portion of the third additional tube 31 or to any fixed part of the trumpet 1, adjusting the additional tube tuning slide 32 to the desired predetermined position, and then connecting the block assembly 77 of the third additional tube solenoid assembly 72 to the additional tube tuning slide 32 in the desired predetermined position. FIG. 5 shows the inner tube 41 of the third additional tube tuning slide being exposed by the distance that the additional tube tuning slide 32 is extended from the additional tube 31 when the additional tube tuning slide 32 is set or adjusted to the first predetermined position.

A solenoid assembly is also provided for the first additional tube 11. The frame of the first additional tube solenoid assembly 71 is removably connected by, for example, a conventional clamp 78c to the fixed portion of the first additional tube 11 or to any fixed part of the trumpet 1, and the block assembly 77 of the first additional tube solenoid assembly 71 is removably connected by, for example, a conventional clamp 78d to the first additional tube tuning slide 12, in the manner that the third additional tube solenoid assembly 72 is connected with respect to the third additional tube 31. For the neutral position of the first additional tube solenoid assembly 71, the additional tube tuning slide 12 is set or adjusted to a first predetermined position, which may be, for example, to provide the correct first additional tube length to lower the pitch by two semitones. The first additional tube solenoid assembly 71 may be set or adjusted to its neutral position by first connecting the frame 52 of the first additional tube solenoid assembly 71 to the fixed portion of the first additional tube 11 or to any fixed part of the trumpet 1, adjusting the additional tube tuning slide 12 to the desired predetermined position, and then connecting the block assembly 77 of the first additional tube solenoid assembly 71 to the additional tube tuning slide 12 in the desired predetermined position.

When the first or third additional tube solenoid assembly 71,72 is in the neutral position, the second end section 58 of the plunger 53 extends a distance beyond the second side of the frame 63. The stroke or throw of the plunger 53 when either solenoid assembly 71,72 is energized will equal the distance between the second side of the frame 63 and the knurled nut 68 on the threaded portion 66 of the second end section 58 of the plunger 53 of each solenoid assembly 71,72. The shorter of the distance between the central portion 56 of the plunger 53 and the first side 62 of the frame 52 and length of the threaded portion 66 of the second end section 58 of the plunger 53 will define the maximum adjustability stroke or throw of the plunger 53.

Figure 6:
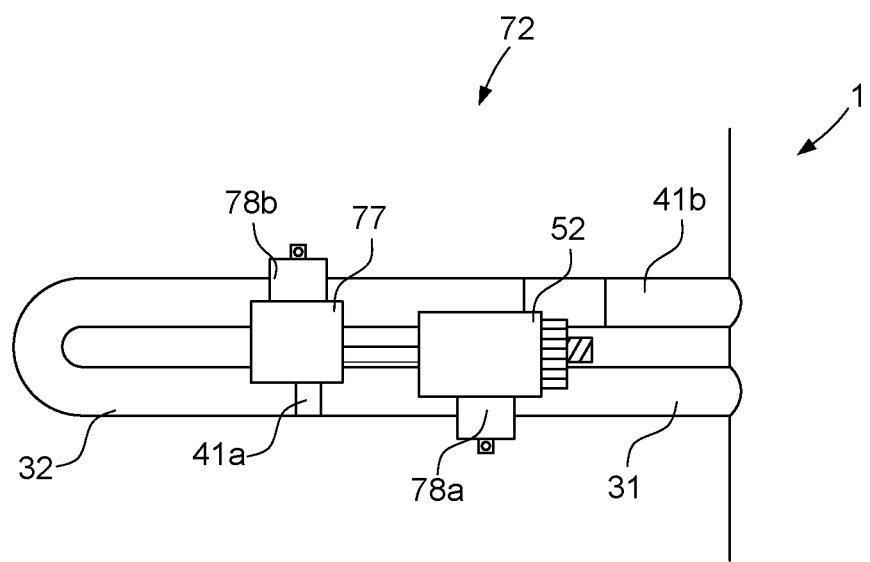
FIG. 6 shows a side view of the solenoid assembly connected to the third additional tube in the engaged position.

FIG. 6 shows the third additional tube solenoid assembly 72 removably connected to the third additional tube 31 and in the engaged position. For the engaged position of the third additional tube solenoid assembly 72, the additional tube tuning slide 32 is set or adjusted to a second predetermined position, which may be, for example, to provide the correct third additional tube length in addition to the first additional tube length (with the first additional tube tuning slide in the neutral position) to lower the pitch by five semitones. The second predetermined position of the third additional tube tuning slide 32 is set or adjusted by adjusting the stroke or throw of the plunger 53, which is done by moving the knurled nut 68 along the threaded portion 66 of the second end section 58 of the plunger 53 by rotating the knurled nut 68 clockwise or counterclockwise on the threaded portion 66 of the second end section 58 of the plunger 53. FIG. 6 also shows the inner tube 41 of the additional tube tuning slide 31 being exposed by the distance that the additional tube tuning slide 32 is extended from the additional tube 31 in the engaged position, which distance is greater than the distance that additional tube tuning slide 32 is extended from the additional tube 31 in the neutral position by the distance of the stroke or throw of the plunger 53.

As discussed previously, a solenoid assembly is also provided for the first additional tube 11. For the engaged position of the first additional tube solenoid assembly 71, the additional tube tuning slide 12 is set or adjusted to a second predetermined position, which may be, for example, to provide the correct first additional tube length in addition to the second additional tube 21 length to lower the pitch by three semitones. When the first or third additional tube solenoid assembly 71,72 is in the engaged position, the knurled nut 68 on the second end section 58 of the plunger 53 is stopped by the second side of the frame 63 as shown in FIG. 6.

Figure 7A:
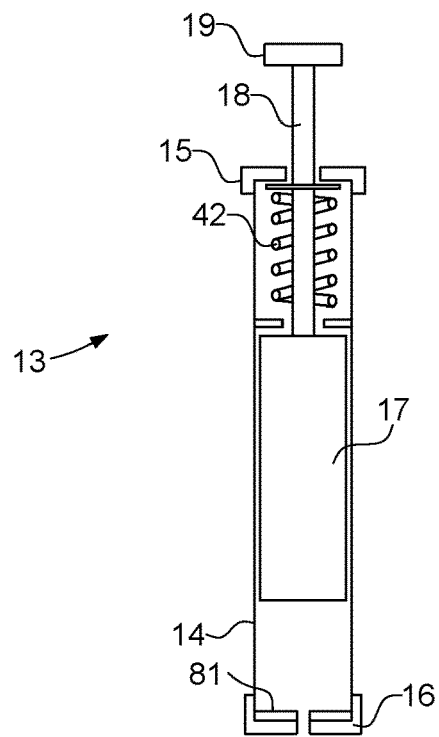
FIG. 7A shows a section view of the first valve assembly with the sensor in the lower cap.
Figure 7B:
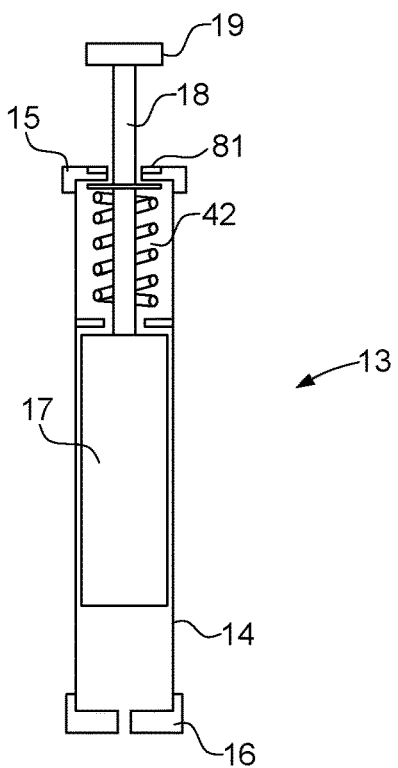
FIG. 7B shows a section view of the first valve assembly with the sensor in the upper cap.

FIGS. 7A and 7B show a section view of the first piston valve assembly 13. The brass instrument includes a piston valve assembly for operating each of the first 10, second 20, and third 30 valves. In addition, there is a sensor 81, 82, or 83 for each piston valve assembly, a first valve sensor 81, a second valve sensor 82, and a third valve sensor 83, for detecting whether the valve is in the position that directs air flow to bypass its additional tube (the first position) or is in the depressed position that directs air flow into its additional tube (the second position). As shown in FIGS. 7A and 7B, the first valve piston assembly 13 includes a housing 14, an upper housing cap 15, and a lower housing cap 16. FIG. 7A shows an embodiment in which a proximity sensor 81 is mounted on or within the top of the lower housing cap of the first valve piston. FIG. 7B shows an embodiment in which a proximity sensor 81 is mounted on or within the top of the upper housing cap of the first valve piston.

There is a piston 17 within the housing that has openings (not shown) for directing the air flow into the first additional tube 11 when the piston 17 is depressed and directing the air flow to bypass the first additional tube 11 when the piston 17 is not depressed. There is a piston rod 18 extending beyond the top of the housing 14 through the upper housing cap 15, with the valve key 19 at the top of the piston rod 18 for engagement by the player's finger to selectively depress the piston. There is a coil return spring 42 within the housing for biasing the piston 17 to a raised position in which the piston 17 directs the air flow to bypass the first additional tube 11 when the player's finger is not depressing the valve key 19.

The brass instrument includes a similar piston assembly for operating each of the second and third piston valves (not shown). Each of the second and third piston assemblies includes a housing, an upper housing cap, and a lower housing cap. There is a piston (second valve piston) within the second valve piston assembly housing that has openings for directing the air flow into the second additional tube 21 when the second valve piston is depressed and directing the air flow to bypass the second additional tube 21 when the second valve piston is not depressed, and there is a piston (third valve piston) within the third valve piston assembly housing that has openings for directing the air flow into the third additional tube 31 when the third valve piston is depressed and directing the air flow to bypass the third additional tube 31 when the third valve piston is not depressed. Each of the second and third piston assembly also includes a piston rod extending from the top of the housing through the upper housing cap. Each of the first 19, second 29, and third 39 valve keys is connected to the top of the respective first, second, and third valve piston rod for engagement by the player's finger.

While the invention is described in terms of a piston assembly, the invention is also applicable to brass instruments having rotary or other valve mechanisms.

FIG. 7A shows the embodiment in which the proximity sensors are mounted on or within the top of the lower housing cap of each piston assembly. The first valve proximity sensor 81 is mounted on or within the top of the lower housing cap 16 and is activated when the first valve key 19 is depressed to lower the piston 17 within the housing 14 and bring the bottom end of the piston into proximity with the lower housing cap 16 of the first housing 14. Similarly, the second valve proximity sensor 82 is mounted on or within the top of the lower housing cap and is activated when the second valve key 29 is depressed to lower the second valve piston within the second valve housing and bring the bottom end of the second valve piston into proximity with the lower housing cap of the second valve housing, and the third valve proximity sensor 83 is mounted on or within the top of the lower housing cap and is activated when the third valve key is depressed to lower the third valve piston within the third valve housing and bring the bottom end of the third valve piston into proximity with the lower housing cap of the third valve housing. The proximity sensors 81, 82, 83 are connected to a controller 90 that energizes neither solenoid assembly, only the solenoid assembly for the first additional tube 71, only the solenoid assembly for the third additional tube 72, or the solenoid assemblies for both the first additional tube 71 and the third additional tube 72 depending upon which proximity sensor or sensors are activated.

FIG. 7B shows an embodiment in which the proximity sensors 81, 82, 83 are mounted on or within the top of the upper housing cap for each piston assembly. The proximity sensor 81 for the first valve 10 is mounted on or within the top of the upper housing cap 15 and is activated when the first valve key 19 is depressed to lower the piston 17 within the housing 14 and bring the bottom of first valve key 19 into proximity with the upper housing cap 15 of the first housing 14. Similarly, the proximity sensor 82 for the second valve 20 is mounted on or within the top of the upper housing cap and is activated when the second valve key 29 is depressed to lower the piston within the housing and bring the bottom of second valve key 19 into proximity with the upper housing cap of the second valve housing, and the proximity sensor 83 for the third valve 30 is mounted on or within the top of the upper housing cap and is activated when the third valve key 39 is depressed to lower the piston within the housing and bring the bottom of third valve key 19 into proximity with the upper housing cap of the third valve housing.

The solenoid assemblies also may be selectively energized in response to piezoelectric sensors mounted either on the top of the upper housing cap for each piston assembly or within the housing on the lower housing cap. The piezoelectric sensors if mounted on or within the top of the upper housing cap are activated when a valve key 19, 29, 39 is depressed and contacts the upper housing cap of the piston assembly when operating the respective valve. The piezoelectric sensors if mounted on or within the top of the lower housing cap are activated when a valve key 19, 29, 39 is depressed and the piston contacts the piezoelectric sensors mounted on or within top of the lower housing cap of the piston assembly when operating the respective valve.

Figure 8:
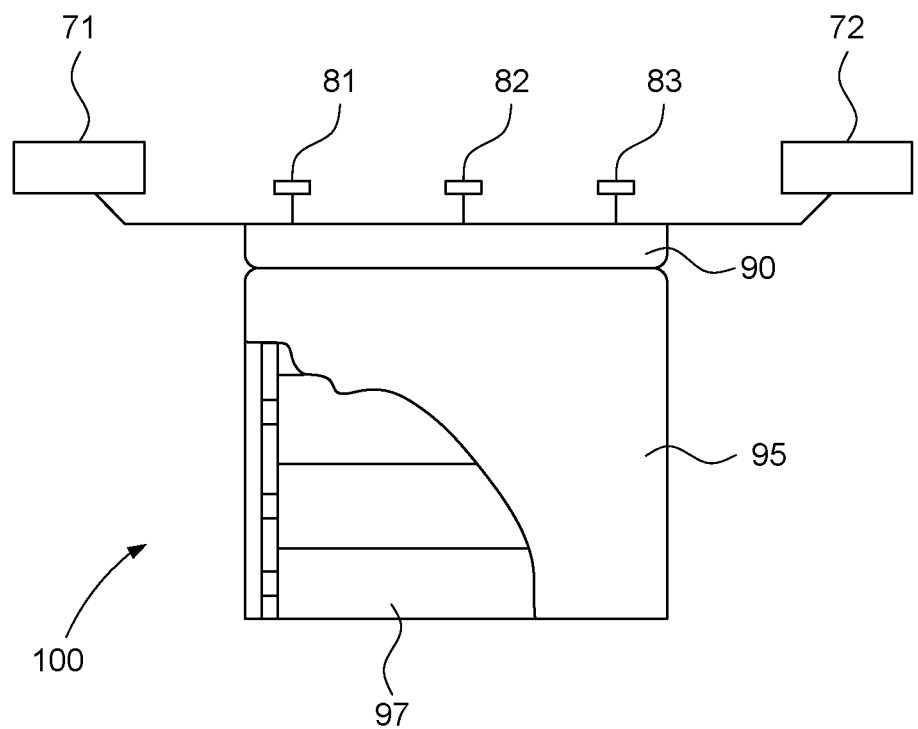
FIG. 8 shows a side view of the controller and power source.

FIG. 8 shows the controller 90 and power supply 95 and shows the sensors 81, 82, 83 and additional tube solenoid assemblies 71, 72 in block form. The controller 90 is preferably located with the power supply 95 within a common housing 100 that is removably connected to lower housing caps. The power supply 95 is preferably located in the lower portion of the housing 100, with the controller 90 located preferably located in the upper portion of the housing 100 for receiving inputs from the sensors 81, 82, 83 in the lower housing caps or upper housing caps. The additional tube solenoid assemblies 71, 72 are connected to the power supply 95 and controller 90 by appropriate wiring. The sensors 81, 82, 83 are connected to the controller 90 by appropriate wiring, running through the holes in in the lower housing caps if mounted on or within the top of the lower housing caps and running down the outside of piston housing 14 if mounted on or within the top of the upper housing caps. The sensors 81, 82, 83 alternatively may have a wireless connection to the controller 90 by, for example, near field communication (NFC). The controller 90 may complete the connection between the power supply 95 and the first additional tube solenoid assembly 71, complete the connection between the power supply 95 and the third additional tube solenoid assembly 72, complete the connection between the power supply 95 and both the first additional tube solenoid assembly 71 and the third additional tube solenoid assembly 72, or keep open the connection between the power supply 95 and both the first additional tube solenoid assembly 71 and the third additional tube solenoid assembly 72, depending upon the inputs from the sensors 81, 82, 83 concerning the condition of the valves 10, 20, 30.

The power supply may be a set of batteries 97 located within a battery compartment 96 in the lower portion of the housing. The power supply, however, could be located remote from the instrument and connected to the instrument by wiring, such as by being worn by the player.

Figure 9:
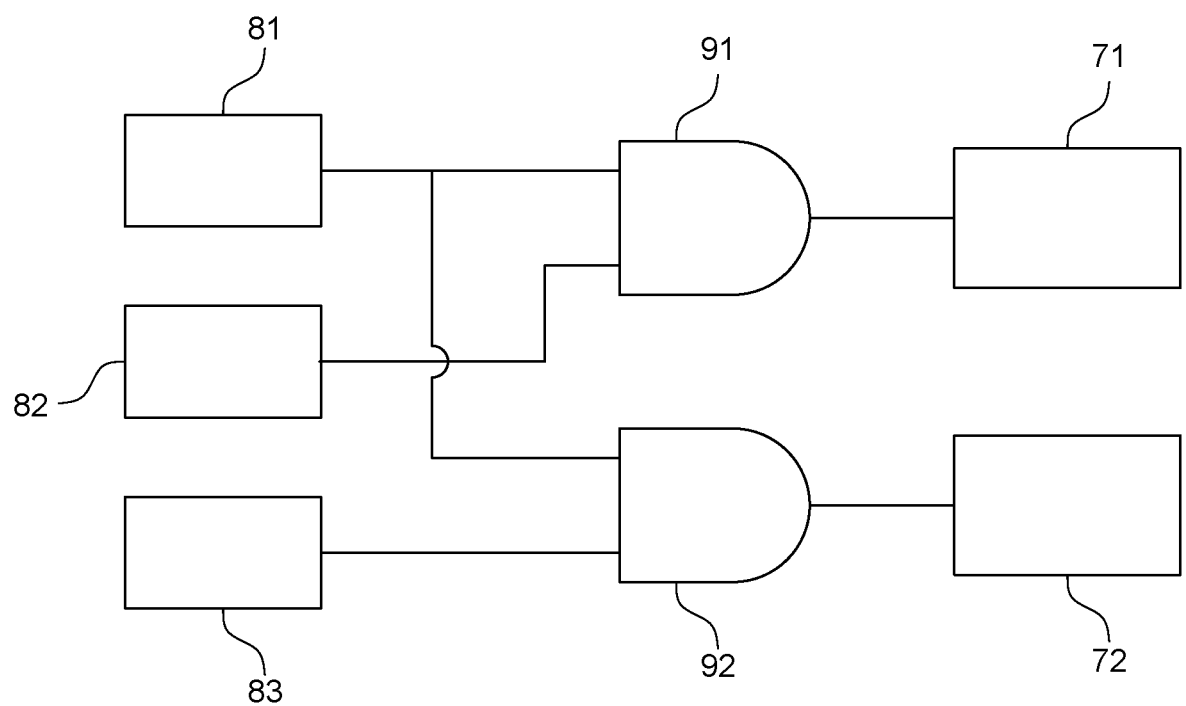
FIG. 9 shows the logic gates for controlling the actuators in response to the sensors.

FIG. 9 shows the logic gates for the preferred embodiment. Neither solenoid assembly is energized if no proximity sensor is activated, only the first valve proximity sensor 81 is activated, only the second valve proximity sensor 82 is activated, or only the third valve proximity sensor 83 is activated. The first valve proximity sensor 81 and the second valve proximity sensor 82 are coupled to the first additional tube solenoid assembly 71 by a first AND logic gate 91, and the first valve proximity sensor 81 and the third valve proximity sensor 82 are coupled to the third additional tube solenoid assembly 72 by a second AND logic gate 92. The first additional tube solenoid assembly 71 is energized if both the first valve proximity sensor 81 and the second valve proximity sensor 82 are activated. The third additional tube solenoid assembly 72 is energized if both the first valve proximity sensor 81 and the third valve proximity sensor 83 are activated. Both the first additional tube solenoid assembly 71 and the third additional tube solenoid assembly 72 are energized if the first valve proximity sensor 81, the second valve proximity sensor 82, and the third valve proximity sensor 83 are all activated.

Table 1 indicates which actuator is engaged for the various valve combinations of a three-valve brass instrument.

TABLE 1

| VALVE(S) DEPRESSED | FIRST VALVE ACTUATOR | THIRD VALVE ACTUATOR |
|---|---|---|
| First Valve | Neutral | Neutral |
| Second Valve | Neutral | Neutral |
| Third Valve | Neutral | Neutral |
| First and Second Valves | Engaged | Neutral |
| First and Third Valves | Neutral | Engaged |
| Second and Third Valves | Neutral | Neutral |
| First, Second, and Third Valves | Engaged | Engaged |

The player should engage the finger saddle 7 or finger ring 8 of the first and third additional tube tuning slides to feel the automatic adjustment of the first and third additional tube tuning slides and become accustomed to the feel of the first and third additional tube tuning slides moving during playing.

Although the invention has been described with reference to particular embodiments, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

REFERENCE NUMERALS LIST

The following is a list of reference numerals used in the detailed description of the invention and drawings:

1 trumpet
2 mouthpiece
3 main tube
4 mouthpiece receiver
5 lead pipe
6 main tuning slide
7 saddle ring
8 finger ring
9 bell
10 first valve
11 first additional tube
12 first additional tube tuning slide
13 first valve piston assembly
14 first valve piston housing
15 first valve upper housing cap
16 first valve lower housing cap
17 first valve piston
18 first valve piston rod
19 first valve key
20 second valve
21 second additional tube
22 second additional tube tuning slide
29 second valve key
30 third valve
31 third additional tube
32 third additional tube tuning slide
39 third valve key
41 tuning slide inner slide
42 piston return spring
50 actuator
52 solenoid assembly frame
53 plunger 54 coil winding
55 return spring
56 plunger central section
57 plunger first end section
58 plunger second end section
62 frame first side
63 frame second side
66 threads on plunger second end section
68 knurled nut
71 first additional tube solenoid assembly
72 third additional tube solenoid assembly
76 enlarged end of plunger first end section
77 block assembly
78a third additional tube solenoid assembly frame clamp
78b third additional tube solenoid assembly block clamp
78c first additional tube solenoid assembly frame clamp
78d first additional tube solenoid assembly block clamp
81 first valve proximity sensor
82 second valve proximity sensor
83 third valve proximity sensor
90 controller
91 first AND logic gate
92 second AND logic gate
95 power source
97 batteries
100 controller and power source housing

What I claim as my invention:

1. A musical instrument including:
a main tube for receiving air flow;
at least three valves connected to the main tube, each valve having an associated additional tube wherein each of the valves is movable from a first position in which air flow bypasses the additional tube associated with the valve and a second position in which air passes through the additional tube associated with the valve to control the pitch of the instrument;
at least two of the three additional tubes having a tuning slide and a fixed portion that is fixed relative to the main tube;
at least two actuators, each actuator for one of the additional tubes having a tuning slide, and each actuator being connected between the fixed portion of the additional tube and the tuning slide, and each actuator moving the tuning slide to which it is connected by a predetermined distance when the actuator is energized;
a sensor connected to each of the at least three valves and providing a signal when the valve to which the sensor is connected is in the second position; and
a controller and a power source operably connected to the sensors and the actuators, wherein the controller directs power to and energizes at least one of the at least two actuators when the controller receives a signal from at least two of the sensors indicating that the valve to which each of the two sensors is connected is in the second position.

2. The musical instrument of claim 1, wherein the musical instrument is a trumpet and said at least three valves comprise a first piston valve, a second piston valve, and a third piston valve.

3. The musical instrument of claim 2, wherein each piston valve comprises a piston movable within a housing, the housing having upper and lower housing caps, and the sensors are located in the lower housing caps.

4. The musical instrument of claim 3, wherein the sensors are proximity sensors that send a signal to the controller when the piston comes into proximity with the lower housing cap.

5. The musical instrument of claim 2, wherein each piston valve comprises a piston movable within a housing, the housing having upper and lower housing caps, and the sensors are located in the upper housing caps.

6. The musical instrument of claim 5, wherein there is a valve key for each piston, and the sensors are proximity sensors wherein the sensors are proximity sensors that send a signal to the controller when the valve key comes into proximity with the upper housing cap.

7. The musical instrument of claim 2, wherein a first actuator of the at least two actuators is connected between the fixed portion of the additional tube associated with the first piston valve and its tuning slide and a second actuator of the at least two actuators is connected between the fixed portion of the additional tube associated with the third piston valve and its tuning slide.

8. The musical instrument of claim 7, wherein the controller directs power to the first actuator when the sensor on the first piston valve sends a signal indicating that the first piston valve is in the second position and the sensor on the second piston valve sends a signal indicating that the second piston valve is in the second position, the controller directs power to the second actuator when the sensor on the first piston valve sends a signal indicating that the first piston valve is in the second position and the sensor on the third piston valve sends a signal indicating that the third piston valve is in the second position, and the controller directs power to both the first and second actuator when the sensor on the first piston valve sends a signal indicating that the first piston valve is in the second position, the sensor on the second piston valve sends a signal indicating that the second piston valve is in the second position, and the sensor on the third piston valve sends a signal indicating that the third piston valve is in the second position.

9. The musical instrument of claim 1, wherein the actuators are linear solenoids.

10. The musical instrument of claim 9, wherein each linear solenoid has a frame and a plunger that moves linearly within the frame when the solenoid is energized, the frame being connected to the fixed portion of the additional tube and the plunger having a first end section extending through the frame and connected to its tuning slide.

11. The musical instrument of claim 10, wherein the plunger has a second end section extending through the frame, the second end section being threaded and having a nut thereon for adjusting the distance the actuator moves the tuning slide when the actuator is energized.

12. The musical instrument of claim 10, wherein the frame of each linear solenoid is removably connected to the fixed portion of the additional tube and the first end section of the plunger is removably connected to the tuning slide of the additional tube.

13. The musical instrument of claim 10, wherein the first end section of the plunger terminates in an enlarged end and is connected to the tuning slide through a block assembly, the block assembly having an opening therein for receiving and retaining the enlarged end of the plunger.

14. The musical instrument of claim 1, wherein the controller and power source are retained in a common housing that is removably connected to the musical instrument.

15. A pitch adjuster for a musical instrument having a main tube for receiving air flow and at least three valves, each valve connecting the main tube to an associated additional tube and movable into a position in which air passes through the additional tube associated with the valve, and with at least two of the three additional tubes having a tuning slide and a portion that is fixed relative to the main tube, the pitch adjuster comprising:

at least two actuators, each actuator being connectable between the fixed portion and the tuning slide of one of the additional tubes, and each actuator being configured to move the tuning slide to which it is connected by a predetermined distance when the actuator is energized;

a sensor connectable to each of the at least three valves and configured to provide a signal when the valve to which the sensor is connected is in the position in which air passes through the additional tube associated with the valve; and a controller and a power source operably connected to the sensors and the actuators, wherein the controller directs power to and energizes at least one of the at least two actuators when the controller receives a signal from at least two of the sensors indicating that the valve to which each of the two sensors is connected is in the position in which air passes through the additional tube associated with the valve.

16. The pitch adjuster of claim 15, wherein the actuators are linear solenoids, each linear solenoid having a frame and plunger that moves linearly within the frame when the solenoid is energized, the frame being connectable to the fixed portion of the additional tube of the musical instrument and the plunger having a first end section extending through the frame and connectable to the tuning slide of an additional tube of the musical instrument.

17. The pitch adjuster of claim 16, wherein the first end section of the plunger terminates in an enlarged end and is connectable to the tuning slide of an additional tube of the musical instrument through a block assembly, the block assembly having an opening therein for receiving and retaining the enlarged end of the plunger.

18. The pitch adjuster of claim 15, wherein the controller and power source are retained in a common housing that is removably connectable to the musical instrument.

19. The pitch adjuster for a musical instrument of claim 16, wherein the plunger has a second end section extending through the frame, the second end section being threaded and having a nut thereon for adjusting the distance the actuator moves the tuning slide when the actuator is energized.

20. The pitch adjuster for a musical instrument of claim 15, further including at least three trumpet piston housing caps and wherein each sensor is mounted within one of the three trumpet piston housing caps.

* * * * *